US012440958B2

(12) United States Patent
Simmons

(10) Patent No.: US 12,440,958 B2
(45) Date of Patent: Oct. 14, 2025

(54) ADJUSTABLE WORKPIECE SUPPORT

(71) Applicant: Calvin Simmons, Suffolk, VA (US)

(72) Inventor: Calvin Simmons, Suffolk, VA (US)

( * ) Notice: Subject to any disclaimer, the term of this patent is extended or adjusted under 35 U.S.C. 154(b) by 369 days.

(21) Appl. No.: 17/935,212

(22) Filed: Sep. 26, 2022

(65) Prior Publication Data

US 2023/0211491 A1 Jul. 6, 2023

Related U.S. Application Data

(60) Provisional application No. 63/296,603, filed on Jan. 5, 2022.

(51) Int. Cl.
*B25H 1/18* (2006.01)
*B25H 1/16* (2006.01)

(52) U.S. Cl.
CPC ................. *B25H 1/18* (2013.01); *B25H 1/16* (2013.01)

(58) Field of Classification Search
CPC ... B25H 1/18; B25H 1/16; B25H 1/04; B25H 1/14; E04G 1/34
USPC ................... 108/5–8, 10, 93, 106, 137, 147; 182/182.2, 141, 182.1, 182.5, 147.2
See application file for complete search history.

(56) References Cited

U.S. PATENT DOCUMENTS 603,148 A * 4/1898 Meyrowitz
1,173,283 A * 2/1916 Leethem ............. E04F 21/1811 108/147
1,927,598 A * 9/1933 Schlichter ................. B66F 7/14 104/32.1
1,947,801 A * 2/1934 Russell .................. A47B 83/00 108/146
2,257,876 A * 10/1941 Berchem ................... E04G 1/34 182/182.3
3,971,608 A * 7/1976 Gans .................... A47B 88/407 312/257.1
4,095,778 A * 6/1978 Wing ....................... B25H 1/04 269/71
4,782,917 A * 11/1988 Schulz ...................... E04G 1/34 182/182.4
5,158,068 A * 10/1992 Pickering ................ F24C 15/12 126/211

(Continued)

FOREIGN PATENT DOCUMENTS

CN 205358722 U * 7/2016
CN 214149232 U * 9/2021

(Continued)

OTHER PUBLICATIONS

CN205358722 English translation (Year: 2016).*
CN214149232 English translation (Year: 2021).*
KR200349557 English translation (Year: 2004).*

*Primary Examiner* — Janet M Wilkens
(74) *Attorney, Agent, or Firm* — Brennan, Manna & Diamond, LLC

(57) ABSTRACT

A novel adjustable sawhorse or workpiece support. The device is an adjustable apparatus to assist in various carpentry and other projects. The device has a work surface, four legs, and a gear and crank mechanism to allow for height adjustment. The device also includes hinges or pivots beneath the work surface that allow for angular adjustment of the work surface. Further, the device has a fastener to secure the work surface and allow for easy removal or replacement, if necessary.

14 Claims, 5 Drawing Sheets

(56) References Cited

U.S. PATENT DOCUMENTS

| | | | | |
|---|---|---|---|---|
| 5,833,185 | A * | 11/1998 | Bradley | B25H 3/006 248/176.1 |
| 5,865,269 | A * | 2/1999 | Eskesen | B25H 1/18 182/182.1 |
| 6,327,982 | B1 * | 12/2001 | Jackson | A47B 23/046 108/142 |
| 6,910,429 | B1 * | 6/2005 | Matay | B25H 3/06 108/44 |
| 2004/0168619 | A1 * | 9/2004 | Lin | B23Q 5/385 108/147 |
| 2012/0199048 | A1 * | 8/2012 | Savalas | D06F 39/12 29/428 |
| 2012/0312197 | A1 * | 12/2012 | Bresette | B25H 1/14 108/29 |
| 2016/0198853 | A1 * | 7/2016 | Liu | B25H 3/028 312/317.3 |

FOREIGN PATENT DOCUMENTS

| | | | |
|---|---|---|---|
| KR | 200319401 | Y1 * | 7/2003 |
| KR | 200349557 | Y1 * | 5/2004 |

* cited by examiner

ADJUSTABLE WORKPIECE SUPPORT

CROSS-REFERENCE TO RELATED APPLICATION

The present application claims priority to, and the benefit of, U.S. Provisional Application No. 63/296,603, which was filed on Jan. 5, 2022, and is incorporated herein by reference in its entirety.

FIELD OF THE INVENTION

The present invention relates generally to the field of workbenches and work assist platforms. More specifically, the present invention relates to an improved adjustable sawhorse shelf that provides users with a mechanism for adjusting the work surface vertically and as well as tilting the plane of the working surface to better suit the work being performed and to maximize access to the workpiece. Accordingly, the present disclosure makes specific reference thereto. Nonetheless, it is to be appreciated that aspects of the present invention are also equally applicable to other like applications, devices, and methods of manufacture.

BACKGROUND

By way of background, this invention relates to improvements in sawhorses, workbenches, and other workpiece support devices. Specifically, the device is adjustable both in height and angle. Adjustable workbenches and other supports are desired in the art as they provide a more comfortable and effective experience while working on various carpentry and other projects. One particular area of concern is the challenge of using a table saw to cut long pieces of wood without the help of versatile equipment or having others nearby to assist. Regular sawhorses are not typically equal in height to that of a table saw, creating an unbalanced workstation. This height difference can lead to improper use of table saws which may result in injury to the user as well as damage to the equipment. This invention allows vertical adjustment of the work surface by use of a novel gear and crank mechanism. This easy-to-use hand crank can be tucked inward toward the tabletop when it is not in use, eliminating a potential tripping hazard and providing a clutter-free workspace.

Furthermore, sawhorses seen in the prior art do not offer the ability to tilt the work surface to better suit the needs of the user or the work being performed. This invention allows tilting of the work surface 90° degrees in either direction by way of a hinge or pivot mechanism underneath the tabletop or base. This feature allows for a more comfortable and safer working environment, allowing straightening of the user's spine and thus preventing chronic problems including, but not limited to, back, shoulder, and neck pain caused by hunching over. Tilting and raising of the work surface also allows for more accuracy for carpentry and other projects requiring a high degree of precision, allowing the user easier access to otherwise hard to reach areas and angles relative to a carpentry or other projects.

Another problem with adjustable sawhorses seen in the prior art is the lack of a tabletop that is removable, interchangeable, or replaceable if necessary. This invention has a tabletop that is secured by a hook and loop style attachment fastener on the underside, allowing for removal, change, or replacement of the tabletop itself should it become damaged over time.

Yet another problem with sawhorses seen in the prior art are tabletops that are easily damaged, requiring frequent replacement. The tabletop of this invention is covered with a cut-resistant fabric or material to prevent scratching or cutting of the tabletop surface.

Specifically, the present invention relates to an adjustable sawhorse shelf to be used with various types of carpentry and other projects. The device is adjustable both in height and angle position to provide for a safe, comfortable, and effective working experience.

Therefore, there exists a long-felt need in the art for an adjustable sawhorse shelf that provides users with the ability to vertically level the working surface to that of a table saw. There is also a long-felt need in the art for an adjustable sawhorse support that allows for the tilting of the work surface for the comfort and accuracy within carpentry and other jobs. Further, there is a long-felt need in the art for an adjustable sawhorse support that provides a hook and loop type fastener system for easy removal or replacement of the work surface. Moreover, there is a long-felt need in the art for a tabletop with protection against scratching or cutting that may result in the frequent need to replace the tabletop. Finally, there is a long-felt need in the art for an adjustable sawhorse support that has a stowable height adjustment mechanism to provide a safer and more ergonomically appropriate working environment.

The subject matter disclosed and claimed herein, in one embodiment thereof, comprises an adjustable sawhorse support for carpentry and other projects which require work to be performed on elongated or other large workpieces. The device features a stowable gear and hand crank mechanism for height adjustment and a hinge or pivot mechanism underneath the tabletop for angle adjustment. The device has two foldable sets of legs that are opened to position the sawhorse in an upright position. The device also includes a removable or replaceable tabletop with a hook and loop type fastener underneath.

In this manner, the adjustable sawhorse support of the present invention accomplishes all of the foregoing objectives and provides users with a device that is adjustable to meet the needs of any carpentry or other project with comfort, safety, ergonomics and effectiveness in mind.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a sawhorse support. The invention includes a tabletop with foldable legs and a novel gear and crank mechanism. The novel gear and crank mechanism can be used to adjust the tabletop or base height by raising and lowering the level of the tabletop. The gear and crank mechanism is stowable inward to prevent a tripping hazard. The device also includes a hinge or pivot mechanism positioned beneath the tabletop or base to provide for the tilting of the tabletop. The tabletop itself is covered with a cut-resistant fabric or other material to prevent damage to the tabletop surface from inadvertent strikes by a hammer, chisel, saw blade, or another tool. The tabletop is also removable, interchangeable, and replaceable should it be required, and is fastened by a hook and loop type fastener, although other suitable fastening systems may be used, such as magnetic, and other mechanical systems, such as snaps, grooves and slots, locking pins or other combination of elements or combinations of any of the foregoing. The magnet is one of neodymiumiron boron (NdFeB), samarium cobalt (SmCo), alnico, ceramic, or ferrite magnets.

The present invention provides a sawhorse shelf for various carpentry and other projects that a hobbyist or professional may engage in. The sawhorse support is adjustable and may be used with table saws, miter saws, and other tools that are used with the workpiece. The adjustability is accomplished by providing a novel gear and crank mechanism for height adjustment and a hinge or pivot mechanism for tilting of the tabletop surface. Retaining devices such as locking pins are used to maintain the desired height and tilt of the sawhorse support once in the desired position.

In one embodiment, the sawhorse support has four legs, akin to that of a standard rectangular table. The legs of the sawhorse may fold inward for storage and may be retractable as well to make carrying the sawhorse from site to site easier as well as to fit within a trunk of a car. On top of the legs is a novel gear and crank mechanism that allows the tabletop to adjust in height up and down. The gear and crank mechanism includes two gear powered cylinders that raise and lower the tabletop surface when the crank is actuated. These gear powered cylinders are located underneath the work surface, in the center line of the tabletop, about ⅓ of the length inward from either "short" side of the generally rectangular sawhorse support. The hand crank mechanism can be tucked in toward the center of the device while not in use to prevent tripping or other injury. The tabletop includes a hinge mechanism underneath that allows for tilting of the tabletop about 90° degrees in either direction, toward or away from the user or workstation. In one embodiment, the tabletop is lined with a cut-resistant fabric or other material to prevent damage to the surface while working.

In one embodiment, the gear powered cylinders provide locking pins to ensure retention of the desired height of the work surface after an adjustment has been made.

In one embodiment, the tilting hinges or pivot beneath the tabletop include a locking mechanism to ensure retention of the desired angle of the work surface.

In another embodiment, the tabletop is removably secured to the base of the sawhorse support with a hook and loop type fastener, or any other suitable securing means known in the art, such as magnetic, and other mechanical systems, such as snaps, grooves and slots, locking pins or other combination of elements or combinations of any of foregoing.

In another embodiment, the sawhorse or workpiece support includes a magnetized plate that extends from each of the legs on the short sides of the generally rectangular present invention. This magnetized plate may be used to attach or hold metal tools, bolts, or any other metal components used in the art of carpentry or which may be needed for other projects for easy access. The magnet is one of neodymiumiron boron (NdFeB), samarium cobalt (SmCo), alnico, ceramic, or ferrite magnets.

In one embodiment, the bottom of the legs of the sawhorse or workpiece support may have rubberized bases to prevent movement such as slipping and sliding of the apparatus while working.

In one embodiment, the tabletop of the present invention may include measuring indica to assist in the carpentry, design, or working process.

In another embodiment, the handle of the novel gear and crank mechanism may be rubberized for a more secure grip while making the adjustments. It may also be ergonomically shaped with a plurality of finger grooves for a more comfortable grip.

In yet another embodiment, the tabletop surface is manufactured from heat-sealable plastic or polymers, such as polypropylene or acrylonitrile-butadiene-styrene (ABS), plywood, or metals, such as aluminum, stainless steel, or combinations thereof.

In yet another embodiment, the hand crank actuator of the novel gear and crank mechanism is removable, and securely attachable by a locking pin, or any other suitable securement apparatus known in the art.

In yet another embodiment of the present invention, the adjustable sawhorse or workpiece support includes a Bluetooth speaker attached to the magnetized plate, allowing for users to listen to music while working. The Bluetooth speaker may be magnetized to attach to the plate and be battery powered or rechargeable.

In a further embodiment, one or more of the legs may contain extendable and retractable legs to allow the user to make additional adjustments to the workpiece support.

Numerous benefits and advantages of this invention will become apparent to those skilled in the art to which it pertains, upon reading and understanding the following detailed specification.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE PRESENT INVENTION

Figure 1:
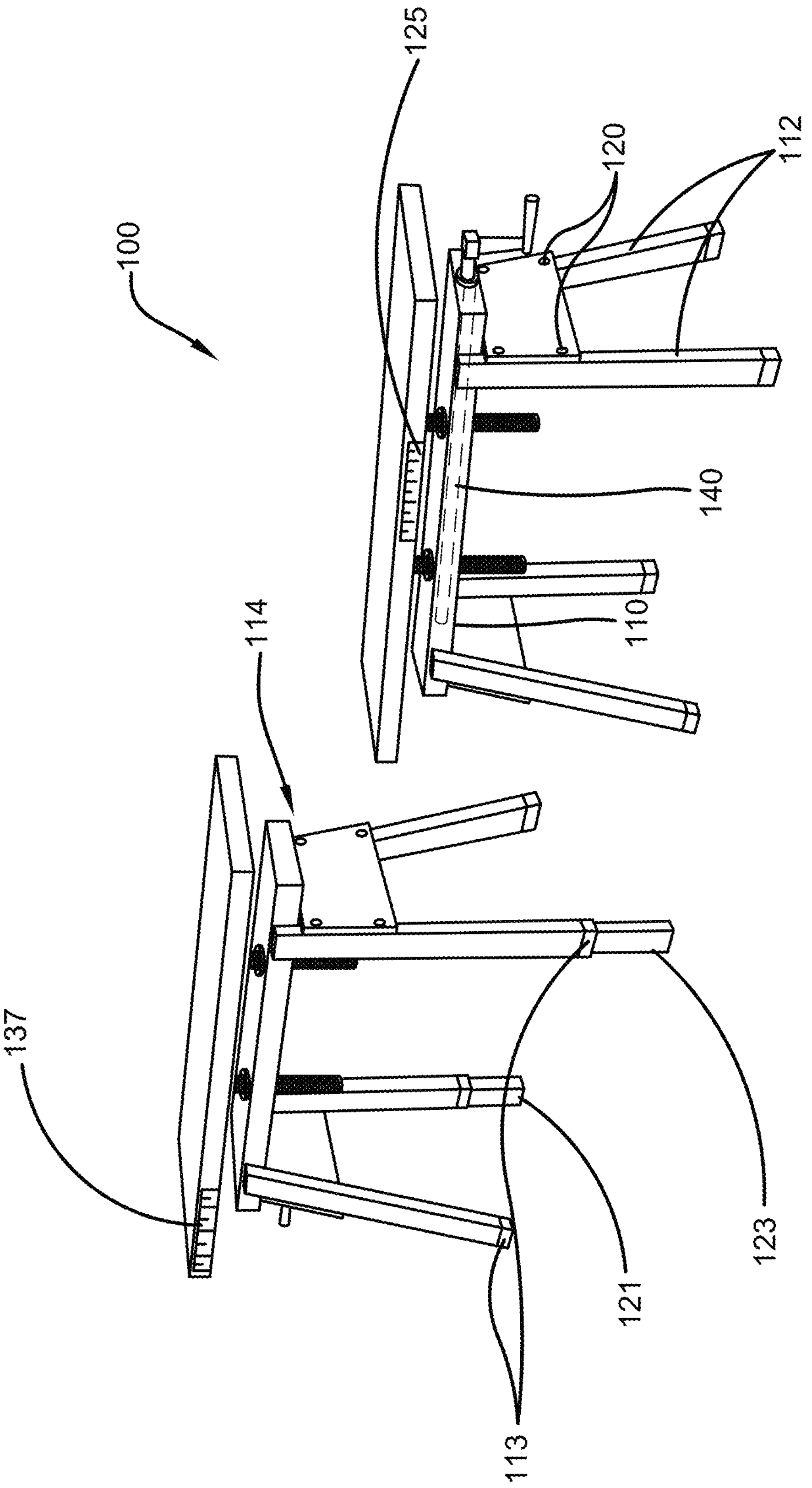
FIG. 1 illustrates a perspective view of one potential embodiment of the adjustable sawhorse or workpiece support of the present invention in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there exists a long-felt need in the art for an adjustable sawhorse or workpiece support that provides users with the ability to vertically level the working surface to that of a table saw or other equipment being used to perform work on the workpiece. In addition, the invention may be used in conjunction with a workpiece or to support a workpiece while it is being installed at a location and to allow the work to be performed while the installation is occurring. There is also a long-felt need in the art for an adjustable sawhorse or workpiece support that allows for the tilting of the work surface for comfort, ergonomics and accuracy with carpentry and other jobs. Further, there is a long-felt need in the art for an adjustable sawhorse or workpiece support that provides a hook and loop type fastener, magnetic, and other mechanical systems, such as snaps, grooves and slots, locking pins or other combination of elements or combinations of any of the foregoing for easy removal or replacement of the work surface. Moreover, there is a long-felt need in the art for a tabletop with protection against scratching or cutting that may result in the frequent need to replace the tabletop. Finally, there is a long-felt need in the art for an adjustable sawhorse or workpiece support that has a stowable height adjustment mechanism to provide a safer working environment.

The present invention, in one exemplary embodiment, is a novel adjustable sawhorse or workpiece support. The device is an adjustable workbench or workpiece support for use with table saws, miter saws, and a plethora of other tools. The device includes a generally planar and geometrically shaped base component of rigid material, such as wood or metal, which has four legs and a gear and crank height adjustment mechanism with gear powered cylinders. The base component has first and second longitudinal edges and first and second transverse end edges. The device also includes a base or tabletop that is protected with cut-resistant fabric or other material. The underside of the tabletop or base includes a hinge or pivot mechanism that allows the tabletop to tilt to a desired angle.

Referring initially to the drawings, FIG. 1 illustrates a perspective view of one embodiment of the adjustable sawhorse or workpiece support 100 of the present invention. In the present embodiment, the adjustable sawhorse or workpiece support 100 is a workbench that allows for adjustment in both the height and angle to provide a comfortable, safe, ergonomically appropriate and effective working experience in the field of carpentry and other areas where supports are used. More specifically, the device has a frame 110, preferably made of plastic but can be made of any suitable material to meet the needs or desires of the user. The frame 110 is connected to a base 114 and the entire unit can be collapsed for easy transportation and storage, akin to sawhorses seen in the prior art. Attached to the four corners of the generally rectangular frame 110 are four legs 112. The legs 112 are attached to the frame 110 by means of fasteners 120. One or more of the legs may have extendable portions 121 and 123 to be able to increase the height of the support or to create additional angles. Fasteners 120 can be any suitable fastener known in the art such as, but not limited to, nuts, bolts, screws, etc. The legs 112, in one embodiment, when connected to the tabletop, are generally comparable in shape to that of a trapezoid and are preferably made of plastic but can be made of any suitable material to meet the preferences of the user. On the bottom of each of the legs 112 are feet 113. Feet 113 encompass the bottom portion of legs 112 and are rubberized to prevent movement or sliding of the adjustable sawhorse or workpiece support 100 while working. The work surface 130 or base 114 is provided with a level 125 so that the user can determine if the support is level. In addition, the work surface 130 may be provided with additional markings 137 for assisting the user in measuring the workpiece and the work to be performed.

Figure 2A:
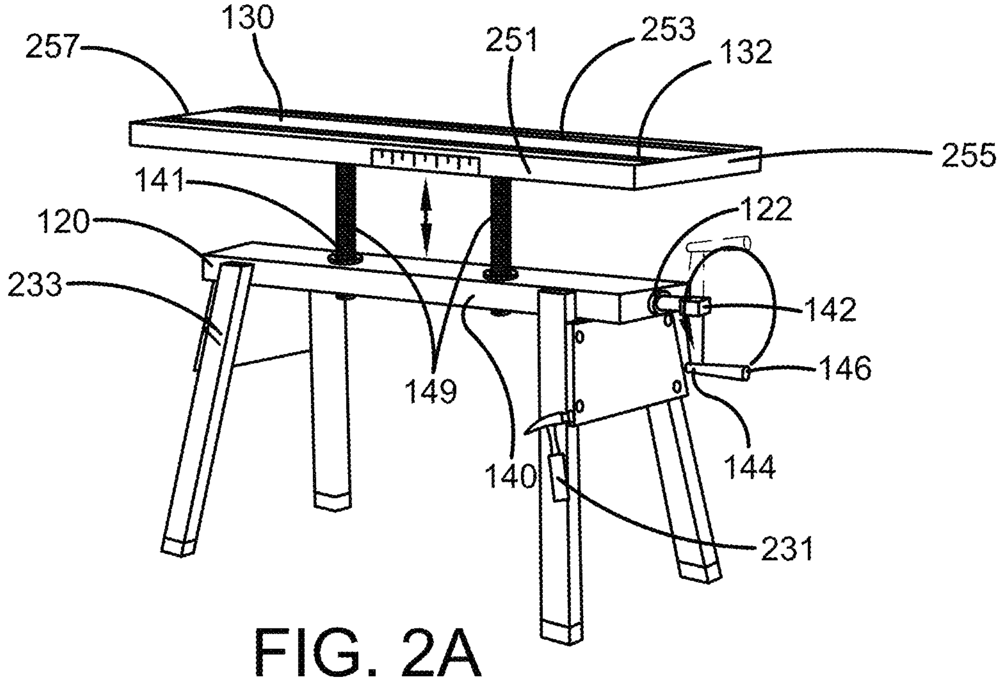
FIG. 2A illustrates a perspective view of one potential embodiment of the adjustable sawhorse or workpiece support of the present invention with the tabletop raised via the gear and crank mechanism in accordance with the disclosed architecture.

As shown in FIG. 2A, a work surface 130 or work base 114 is adjustable in height to level itself with a table saw, or to meet any other desire of the user. The worksurface 130 has first and second longitudinal sides 251 and 253 and first and second transversely extending edges 255 and 257. The legs 112 may be provided with magnetized areas so that tools and other accessories 231 and 233, respectively, can be held by the support. The leveling of the described adjustable sawhorse or workpiece support with a table saw prevents an unbalanced workstation that may result in injury. The level 125 may be referenced to make sure the support surface is level with the table saw or other tool being used to perform the work. The vertical adjustment of the work surface 130 also provides for a more comfortable and effective working experience, eliminating the need for the user to hunch over the work area. The work surface 130 can be rectangular in shape and can be folded for easy transportation and storage. While the work surface 130 if preferably made of plastic, it is reasonable for any other material that suits the preferences of the user to be used. In one embodiment, the work surface may also include strips 132, which may be used as a ruler or meter stick for measuring components of a carpentry project. Alternatively, the strips 132 may be rubber to prevent sliding of the work piece or can be grooves to use with other tools, fences, guides, and combinations thereof.

Also shown in FIG. 2A, the work surface 130 is adjustable in height by means of two gear powered cylinders 149. The gear powered cylinders 149 are located in the center longitudinal line of the sawhorse shelf approximately ⅓ of the total length from either side of the rectangular work surface 130. The gear powered cylinders 149 are actuated upward or downward by the actuating mechanism 140. The actuating mechanism 140 is located below the work surface 130 and is attached to the frame 110 by means of fasteners 120. More specifically, the actuating mechanism 140 includes a series of gears 141. When the gears 141 are rotated in combination with one another, they move against the threaded gear powered cylinders 149 to raise or lower the work surface 130. The actuating mechanism 140 also includes of a spindle 142 and handle 144. The spindle 142 is actuated by the handle 144 by mechanical means, with a user cranking or rotating the handle 144 in a circular motion. This actuates the gears 141 that actuate the gear powered cylinders 149 to raise or lower the work surface 130. The handle 144 can be cranked or rotated in either a clockwise or counterclockwise direction to achieve raising or lowering of the work surface 130.

Once the height of work surface 130 has been set, locking pins 122 are used to retain the work surface 130 at the desired height. While it is proposed that locking pins 122 are used to retain the desired height of the work surface 130, it should be appreciated that any known suitable locking mechanism known in the art could be used. The handle 144 has a rubberized grip 146 for comfort and stability. In one embodiment, the grip 146 is ergonomically shaped with finger grooves for an even more secure grip. While the gears 141, gear powered cylinders 149, locking pins 122 and spindle 142 are preferably made of a metal such as steel or aluminum, it should be appreciated that any other suitable material could be used.

Figure 2B:
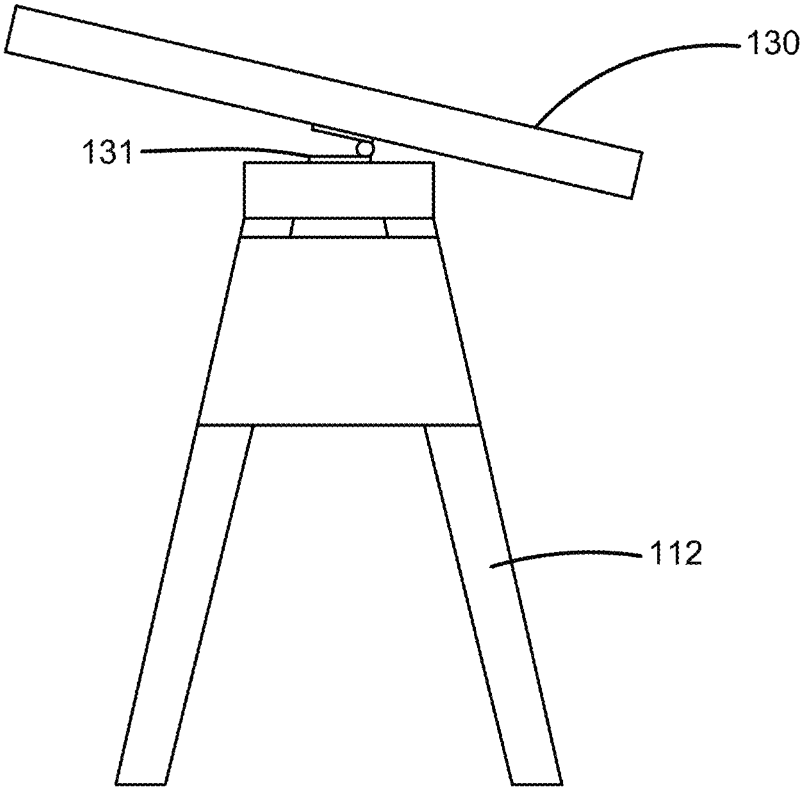
FIG. 2B illustrates a side perspective view of one potential embodiment of the adjustable sawhorse or workpiece support of the present invention with the tabletop in an angled position in accordance with the disclosed architecture.

Beneath work surface 130 are hinges or pivots 131 as shown in FIG. 2B. The hinges 131 can be used to adjust the angle of the work surface 130 to meet the preferences of the user. Tilting of the work surface 130 allows a more comfortable and effective working experience for the user, eliminating the need to hunch over the work area and is also used to accommodate the working angle of the workpiece. The hinges or pivots 131 allow tilting 90 degrees in either direction of the work surface 130 and are attached to the underside of the work surface 130 by fasteners 120. Once the desired tilt of the work surface 130 is achieved by the hinges or pivots 131, the angle can be locked into place by locking pins 122. While it is proposed that locking pins 122 are used to retain the desired angle of the work surface 130, it should be appreciated that any known suitable locking mechanism known in the art could be used.

Figure 3:
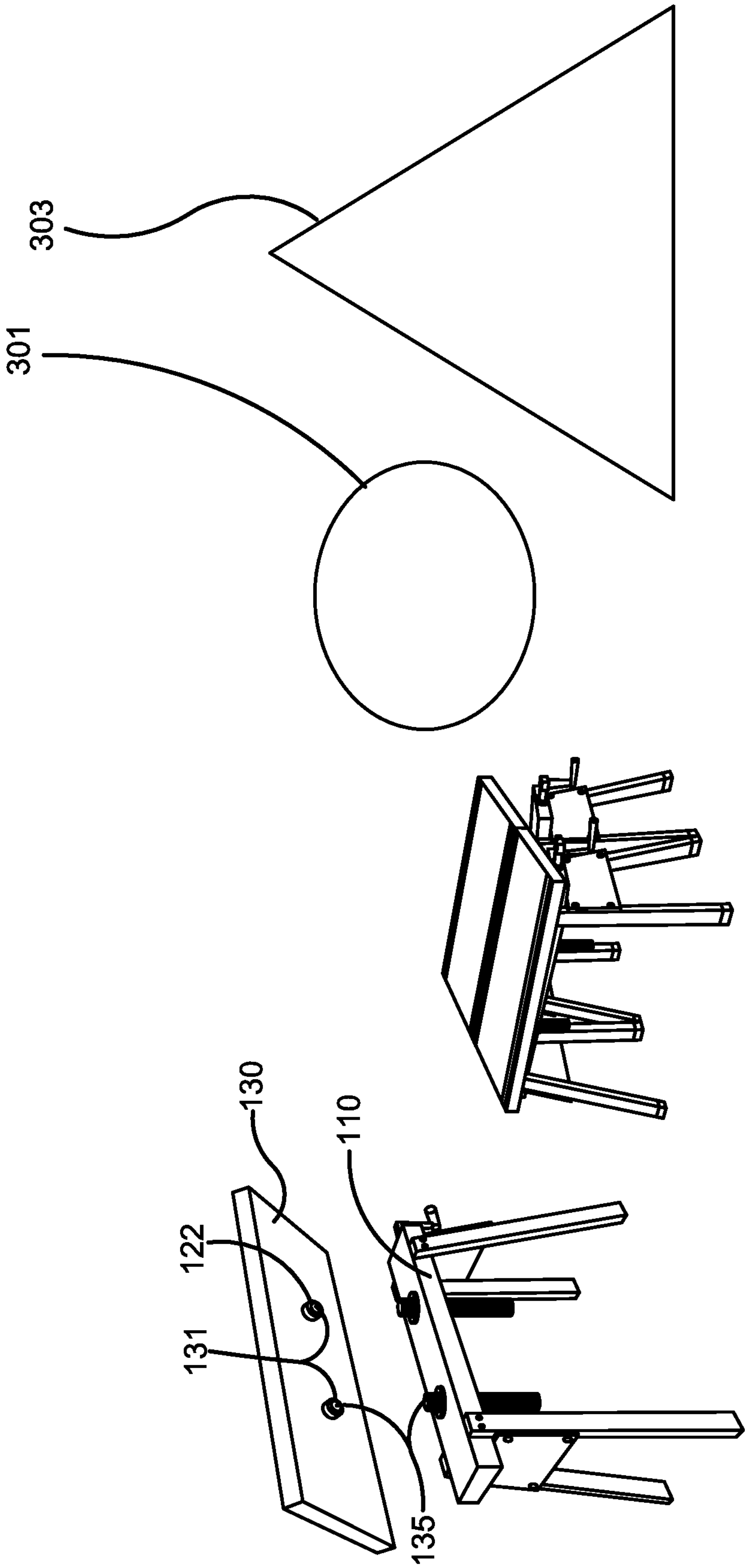
FIG. 3 illustrates a perspective view of one potential embodiment of the adjustable sawhorse or workpiece support of the present invention with the tabletop removed, showing the tilting or pivoting hinge mechanism on the underside, in accordance with the disclosed architecture.

As shown in FIG. 3, the work surface 130 is removable or interchangeable with other types of work surfaces 301, 303 to accommodate the different types of work to be performed. The work surface 130 is secured to the frame 110 by means of a hook and loop type fastener 135. The hook and loop type fastener allows for replacement or removal of the work surface 130. While it is proposed that a hook and loop type fastener 135 is used to accomplish this objective, it should be appreciated that any suitable fastener known in the art can be used.

Figure 4:
FIG. 4 illustrates a perspective view of a worker using a table saw in combination with one embodiment of the adjustable sawhorse or workpiece support of the present invention, in accordance with the disclosed architecture.

FIG. 4 illustrates a perspective view of a worker using a table saw in combination with one embodiment of the adjustable sawhorse or workpiece support 100 of the present invention in accordance with the disclosed specification.

Figure 5:
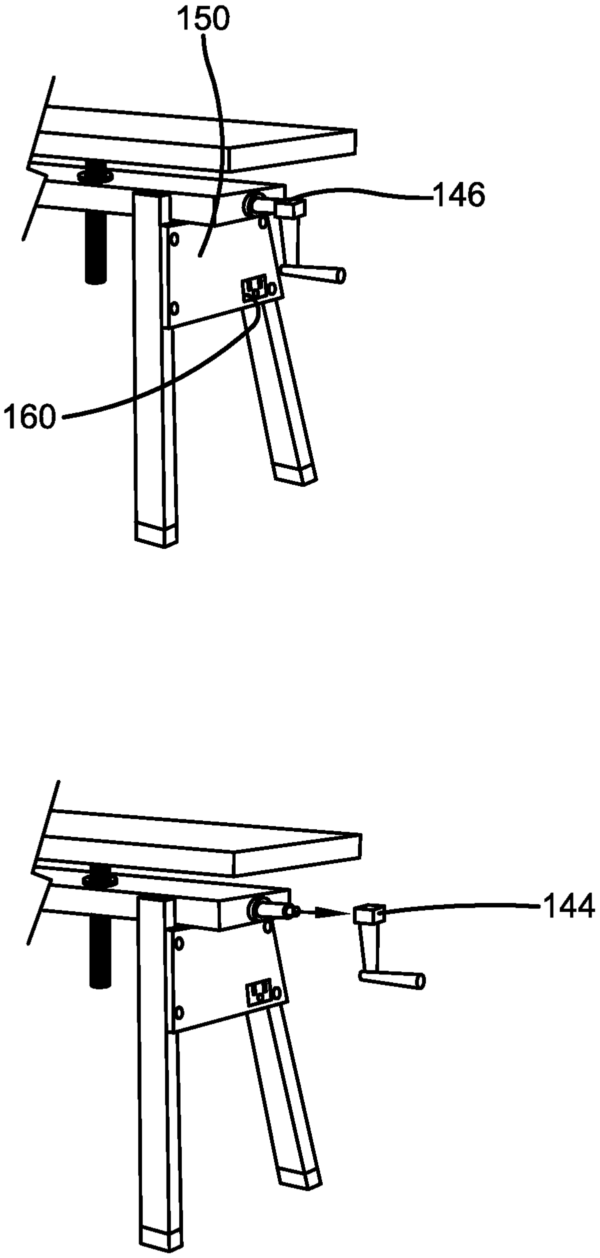
FIG. 5 illustrates a perspective view of one embodiment of the adjustable sawhorse or workpiece support of the present invention disclosing removability of the gear and crank mechanism handle in accordance with the disclosed architecture.

As shown in FIG. 5, the handle 144 is removable when not in use. This prevents tripping or other injury hazard if the handle 144 is sticking out. In another potential embodiment, the handle 144 and spindle 146 can be stowed inward and beneath the worksurface to prevent the previously described tripping or injury hazard.

In one embodiment, an outlet 160 is attached to the frame 110 of the adjustable sawhorse or workpiece support 100. This outlet 160 can be used for powering electric tools, charging of mobile phones, or any other reasonable application. The outlet 160 can be powered by a rechargeable battery or plug into a wall outlet, operating like a power strip.

In another embodiment, the legs 112 of the adjustable sawhorse shelf 100 can be adjusted manually by means of locking pins 122. The desired height would be achieved by pressing the spring-loaded locking pins 122 into holes along the lengths of the legs and the legs can be extended and retracted as needed.

In another potential embodiment, the adjustable sawhorse or workpiece support 100 can be adjusted automatically by a remote control. This may be achieved by the use of electronically powered hydraulic cylinders or electric motors and a gear system.

In one embodiment, a magnetic plate 150 extends from each of the legs on the short sides of the present invention. The magnetic plate 150 can be used to hold metal tools, bolts, or any other metal components used in the art of carpentry for easy access.

In another embodiment, a Bluetooth speaker with a magnet may be attached to the metal plate 150 to allow the user to listen to music or podcasts while working. The Bluetooth speaker is removable and is either battery powered or rechargeable.

Certain terms are used throughout the following description and claims to refer to particular features or components. As one skilled in the art will appreciate, different users may refer to the same feature or component by different names. This document does not intend to distinguish between components or features that differ in name but not structure or function. As used herein "adjustable sawhorse shelf", "workpiece support", "sawhorse shelf", "workbench" and "device" are interchangeable and refer to the adjustable sawhorse shelf 100 of the present invention.

Notwithstanding the foregoing, the adjustable sawhorse or workpiece support 100 of the present invention can be of any suitable size and configuration as is known in the art without affecting the overall concept of the invention, provided that it accomplishes the above-stated objectives. One of ordinary skill in the art will appreciate that the adjustable sawhorse shelf 100 as shown in FIGS. 1-5 are for illustrative purposes only, and that many other sizes and shapes of the adjustable saw horse or workpiece support 100 are well within the scope of the present disclosure. Although the dimensions of the adjustable sawhorse or workpiece support 100 are important design parameters for user convenience, the adjustable sawhorse or workpiece support 100 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A workpiece support comprising:

a worksurface;

a set of legs for supporting the worksurface, wherein the worksurface is connected to the set of legs;

a pair of gear powered cylinders for repositioning the worksurface relative to the set of legs;

an actuating mechanism configured to actuate the pair of gear powered cylinders to adjust a height of the worksurface, wherein the actuating mechanism comprises a spindle and a handle;

a frame; and an outlet attached to the frame, wherein each leg is securable at an adjusted height and further wherein the worksurface can be angled up to 90° in either direction from a horizontal position.

2. The workpiece support as recited in claim 1 further comprising a set of hinges or pivots located beneath the worksurface for angling the worksurface relative to the set of legs.

3. The workpiece support as recited in claim 1, wherein the worksurface is interchangeable with a second worksurface.

4. The workpiece support as recited in claim 1, wherein the worksurface comprises a level.

5. The workpiece support as recited in claim 4, wherein the worksurface further comprises a strip.

6. The workpiece support as recited in claim 5, wherein the strip is a ruler or a groove for a fence or a tool.

7. The workpiece support as recited in claim 1, wherein the set of legs further comprise at least one magnetic plate for holding a tool or an accessory.

8. The workpiece support as recited in claim 1, wherein the handle is removable and repositionable to beneath the worksurface.

9. A sawhorse comprising:

a frame comprising a set of legs, wherein each of the set of legs is extendable;

a worksurface attached to the set of legs;

a pair of gear powered cylinders;

a pair of hinges;

an actuating mechanism configured to actuate the pair of gear powered cylinders to adjust a height of the worksurface, wherein the actuating mechanism comprises a spindle and a handle;

a set of strips in the worksurface, wherein the set of strips may be one of a ruler or a groove for receipt of a fence or a tool;

an outlet attached to the frame; and wherein the worksurface is connected to the frame by a hook and loop fastener and further wherein the worksurface can be rotated up to 90° in either direction from a horizontal position.

10. The sawhorse as recited in claim 9, wherein the worksurface is angled by the pair of hinges, and further wherein the pair of hinges are positioned on an underside of the worksurface.

11. The sawhorse as recited in claim 9 further comprising at least one magnet positioned on the set of legs for supporting a tool or other accessory.

12. The sawhorse as recited in claim 11, wherein the at least one magnet is one of a neodymiumiron boron (NdFeB) magnet, a samarium cobalt (SmCo) magnet, an alnico magnet, a ceramic magnet or a ferrite magnet.

13. An adjustable sawhorse comprising:

a tabletop;

a frame connected to the tabletop and comprising a set of legs, wherein each of the set of legs has a rubberized foot and is extendable;

a pair of gear powered cylinders;

a rotating arm connected to the pair of gear powered cylinders;

a magnetized area positioned on each of the set of legs for magnetically attaching a tool and an accessory;

at least one hinge or pivot connecting the tabletop to the frame and allowing the tabletop to pivot 90° in either direction from a horizontal orientation; and a battery powered outlet attached to the frame; and wherein each leg is securable at an adjusted height.

14. The adjustable sawhorse as recited in claim 13, wherein the tabletop comprises a cut resistant fabric or material.

* * * * *